US007646806B2

(12) United States Patent
Cohen

(10) Patent No.: US 7,646,806 B2
(45) Date of Patent: Jan. 12, 2010

(54) DOUBLE EQUALIZER FOR MULTI-PATH REJECTION

(75) Inventor: Yossef Cohen, Nesher (IL)

(73) Assignee: Zoran Corporation, Sunnyvale, CA (US)

( * ) Notice: Subject to any disclaimer, the term of this patent is extended or adjusted under 35 U.S.C. 154(b) by 601 days.

(21) Appl. No.: 11/428,810

(22) Filed: Jul. 5, 2006

(65) Prior Publication Data

US 2008/0008233 A1 Jan. 10, 2008

(51) Int. Cl.
*H03H 7/30* (2006.01)
(52) U.S. Cl. .................. 375/231; 375/232; 375/341
(58) Field of Classification Search .......... 375/231, 375/232, 341
See application file for complete search history.

(56) References Cited

U.S. PATENT DOCUMENTS

| 5,539,774 | A | * | 7/1996 | Nobakht et al. ............ 375/232 |
| 5,959,703 | A | | 9/1999 | Oh et al. ................. 348/845.1 |
| 6,647,071 | B2 | | 11/2003 | Sommer et al. ............ 375/285 |
| 6,734,920 | B2 | | 5/2004 | Ghosh et al. ............. 348/614 |
| 6,775,334 | B1 | | 8/2004 | Liu et al. ................. 375/341 |
| 7,194,047 | B2 | * | 3/2007 | Strolle et al. ............. 375/341 |
| 7,257,172 | B2 | * | 8/2007 | Okamoto et al. .......... 375/341 |
| 2002/0159543 | A1 | | 10/2002 | Perlow et al. ............. 375/324 |
| 2004/0258184 | A1 | | 12/2004 | Liu et al. ................ 375/350 |
| 2005/0129107 | A1 | | 6/2005 | Park et al. ................ 375/233 |

FOREIGN PATENT DOCUMENTS

| EP | 0688110 A2 | 12/1995 |
| EP | 1065851 A1 | 1/2001 |
| WO | WO 02/091572 A1 | 11/2002 |
| WO | WO 2006/052156 A1 | 5/2006 |

OTHER PUBLICATIONS

Kohno, R., et al., "Combination of Cancelling Intersymbol Interference and Decoding of Error-Correcting Code," Proceedings of the Institution of Electrical Engineers, Stevenage, England, Jun. 1986, pp. 224-231.
International Search Report and Written Opinion for International Application No. PCT/US07/072407, mailed Jan. 2, 2008.

* cited by examiner

*Primary Examiner*—David C Payne
*Assistant Examiner*—Tanmay K Shah
(74) *Attorney, Agent, or Firm*—Morgan, Lewis & Bockius LLP

(57) ABSTRACT

An apparatus for improved reception of a signal is described. The apparatus includes an equalizer that has at least two cascaded maximum-likelihood detectors and an adjustable delay unit. The equalizer and the adjustable delay unit are configured for adaptation in accordance with one or more multi-path signals in a communication channel that conveys the signal.

15 Claims, 7 Drawing Sheets

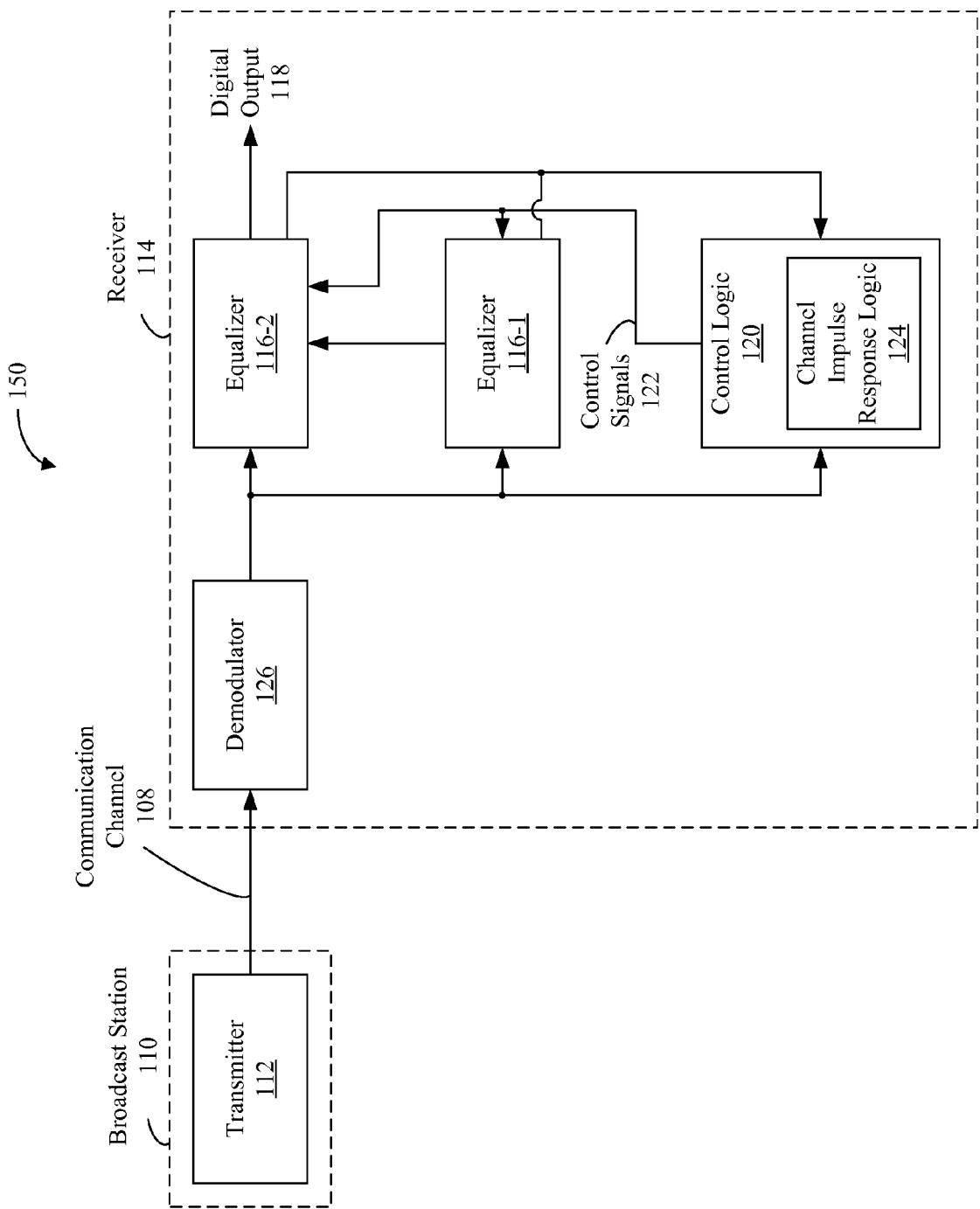

DOUBLE EQUALIZER FOR MULTI-PATH REJECTION

TECHNICAL FIELD

The disclosed embodiments relate to receivers and, in particular, to receivers that include an equalizer having cascaded maximum-likelihood detectors that reduce or eliminate multi-path signals.

BACKGROUND

Receivers in digital communications systems are used to detect and extract information or data signals from a received signal. A variety of effects may reduce the performance of a receiver. These include noise, one or more nonlinearities, and one or more spurious signals associated with a communication channel between a transmitter and the receiver. The spurious signals may include interference signals, such as one or more echoes or multi-path signals.

Multi-path signals are often associated with reflections from objects in the communication channel. In general, a respective multi-path signal may have a different amplitude than a desired signal and/or may be phase or time shifted relative to the desired signal. The time shift may be positive or negative, i.e., the respective multi-path signal may lead or lag the desired signal. Such multi-path signals are referred to as a pre-multi-path signal and a post-multi-path signal, respectively.

Unfortunately, multi-path signals may be problematic for conventional receivers. Multi-path signals often contain similar spectral content to the desired signal. Indeed, the multi-path signals often resemble the desired signal. Multi-path signals may vary as a function of time, for example, due to motion of the transmitter and/or receiver, or other changes in the communication channel. Conventional receivers may have difficulty in reliably detecting the desired signals in the presence of one or more pre-multi-path signals and/or one or more post-multi-path signals.

Accordingly, there is a need for improved receivers that can reliably detect desired signals in the presence of multi-path signals.

SUMMARY OF EMBODIMENTS

The above deficiencies and other problems associated with conventional receivers of input data streams corresponding to the desired signals are reduced or eliminated by the disclosed equalizer.

In some embodiments, an apparatus for improved reception of a signal includes an equalizer that has at least two cascaded maximum-likelihood detectors and an adjustable delay unit. The equalizer and the adjustable delay unit are configured for adaptation in accordance with one or more multi-path signals in a communication channel that conveys the signal.

The one or more multi-path signals may include a plurality of multi-path signals. The plurality of multi-path signals may include a pre-multi-path signal or a post-multi-path signal, or both. The signal and each of the multi-path signals may have a corresponding predefined temporal characteristic, such as a temporal centroid. The predefined temporal characteristic of a first multi-path signal in the plurality of multi-path signals may occur prior to the predefined temporal characteristic of the signal. The predefined temporal characteristic of a second multi-path signal of the plurality in multi-path signals may occur after the predefined temporal characteristic of the signal.

Signal reception may be improved by reducing or eliminating interference due to the one or more multi-path signals. The signal may include a digital television signal. The digital television signal may be compatible with an 8-level vestigial sideband (8-VSB) modulation technique or format. The signal may include multiple data packets.

The equalizer and the adjustable delay unit may be configured for adaptation in accordance with at least one channel characteristic of the communication channel. The channel characteristic may include an impulse response, a step response or a transfer function.

The cascaded maximum-likelihood detectors may include a first maximum-likelihood detector and a second maximum-likelihood detector. The first maximum-likelihood detector may include a first feedback loop based on a first path memory that has a shorter delay than a pre-determined value and may have a first output that corresponds to a second path memory that has a longer delay than the pre-determined value. The second maximum-likelihood detector may be coupled to the first output and may have a second output that corresponds to a third path memory that has a longer delay than the pre-determined value.

The adjustable delay unit may be configured for adaptation in accordance with a length of the second path memory and/or the one or more multi-path signals. The adjustable delay unit may be coupled to the second maximum likelihood detector and may be configured to be coupled to the signal.

The second maximum likelihood detector may be configured to detect data in the signal in accordance with data estimates provided by the first maximum likelihood detector. The cascaded maximum-likelihood detectors may be Viterbi detectors. In some embodiments, the equalizer may include one or more additional cascaded maximum-likelihood detectors.

In some embodiments, the equalizer may include a first feedback equalizer in the first feedback loop. The first feedback equalizer may be a decision feedback equalizer. In some embodiments, the equalizer may include a first feed forward equalizer coupled to the first maximum likelihood detector and may be configured to be coupled to the signal.

In some embodiments, the equalizer may include a feed forward equalizer coupled to the first output and the second maximum likelihood detector. The feed forward equalizer may be a decision feed forward equalizer. In some embodiments, the equalizer may include another feed forward equalizer coupled to the adjustable delay unit and the second maximum likelihood detector. In some embodiments, the equalizer may include an error correction circuit coupled to the second output.

In another embodiment, a process of improving reception of a signal is described. The signal is received from the communication channel. A first symbol stream is determined from the signal using the first maximum likelihood detector in the equalizer. A delayed version of the signal is generated. The delayed version of the signal has an adjustable delay that is determined in accordance with one or more multi-path signals in the communication channel. A second symbol stream is determined from the delayed version of the signal and the first symbol stream using the second maximum likelihood detector in the equalizer.

BRIEF DESCRIPTION OF THE DRAWINGS

FIG. 1B is an illustration of an embodiment of a communication system.

Like reference numerals refer to corresponding parts throughout the drawings.

DESCRIPTION OF EMBODIMENTS

Figure 1A:
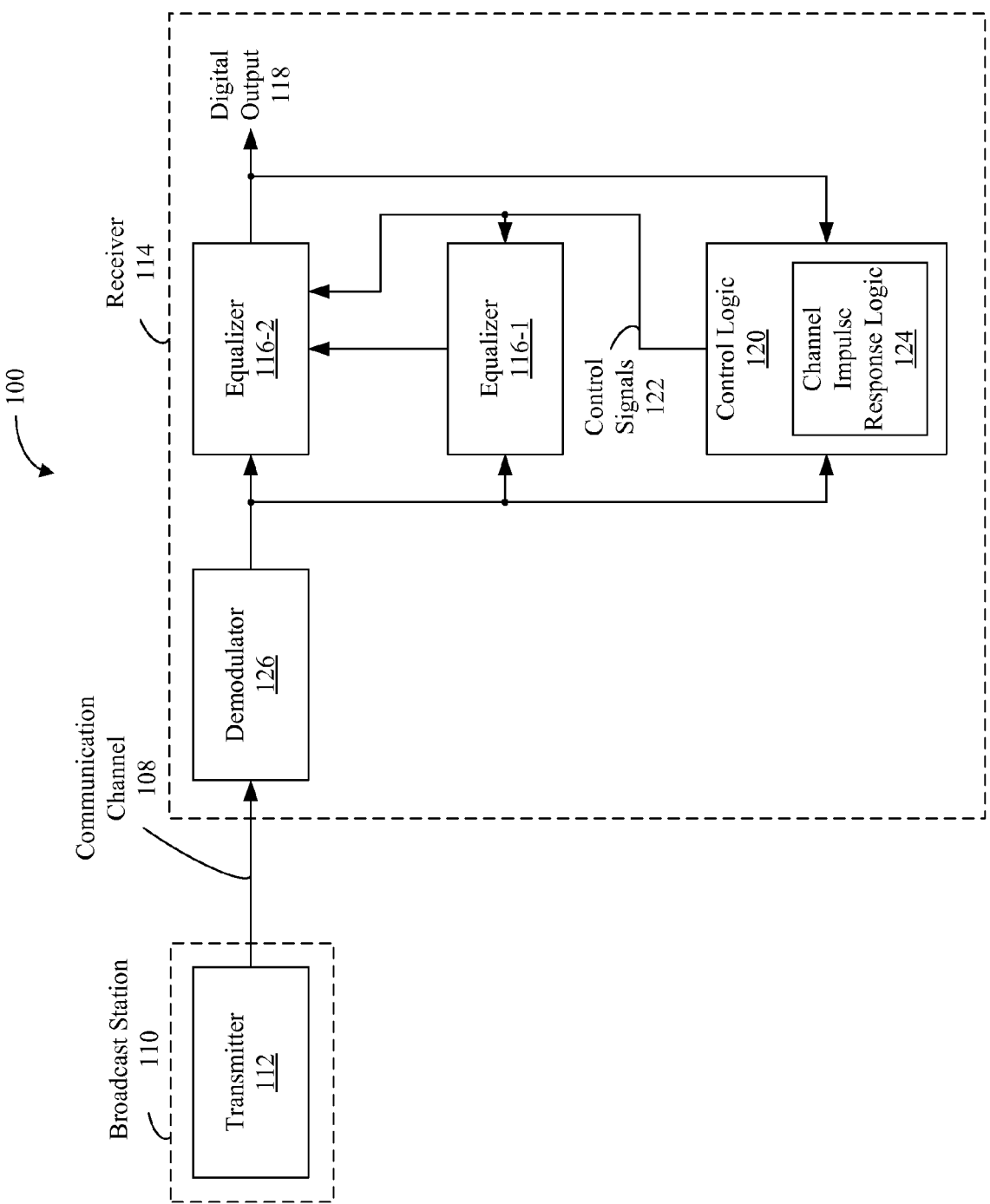
FIG. 1A is an illustration of an embodiment of a communication system.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Embodiments of an adjustable receiver and a related equalizer are disclosed. The receiver may receive a signal that is conveyed by a communication channel. The signal may include one or more multi-path signals or ghost signals, including a pre-multi-path signal, a post-multi-path signal, or both, that are associated with the communication channel. The receiver and the related equalizer may be adjusted to reduce and/or eliminate interference signals, such as the one or more multi-path signals, thereby improving reception of the signal. This may be useful when attempting to receive the signal using an indoor antenna.

The signal may correspond to data, audio and/or video. The signal may be analog and/or digital. The signal may be compatible with protocols, technologies or standards including but not limited to Nation Television Systems Committee (NTSC), Phase Alternating Line (PAL), Sequential Color and Memory (SECAM), High Definition Television (HDTV), Advanced Television Standards Committee (ATSC), High Definition Multi-Media Interface (HDMI), Digital Video Interface (DVI), digital television, one or more Motion Picture Experts Group (MPEG) standards, one or more cellular telephone standards (such as Global System for Mobile Communications or GSM, Enhanced Data GSM Environment, wideband code division multiple access, code division multiple access, and/or time division multiple access), Bluetooth, Wireless Fidelity or Wi-Fi (such as IEEE 802.11a, IEEE 802.11b, IEEE 802.11g and/or IEEE 802.11n), voice over Internet Protocol, Wi-MAX, a Universal Serial Bus (USB) standard (such as USB 2.0), an IEEE 1394 standard (also known as Firewire), and/or other wireless communications protocols (such as those for a wireless local area network and/or a metropolitan area network), including communication protocols not yet developed as of the filing date of this document.

In an exemplary embodiment, the equalizer may include a plurality of cascaded maximum-likelihood detectors and an adjustable delay unit. The equalizer may include one or more feedback and/or feed forward loops. The cascaded maximum-likelihood detectors may be Viterbi detectors. In some embodiments, the equalizer may include one or more additional cascaded maximum-likelihood detectors. At least one of the one or more feedback and/or feed forward loops may include a decision feedback equalizer. In some embodiments, the equalizer may include an error correction circuit coupled to an output from a second maximum likelihood detector in the cascaded maximum-likelihood detectors.

The equalizer and the adjustable delay unit may be adapted in accordance with the one or more multi-path signals, a length of a path memory in at least one of the two maximum likelihood detectors, and/or at least one channel characteristic of the communication channel (such as an impulse response, a step response and/or a transfer function). The second maximum-likelihood detector in the cascaded maximum-likelihood detectors may detect data in the signal in accordance with data estimates provided by a first maximum likelihood detector in the cascaded maximum-likelihood detectors. The data estimates may be provided to the second maximum-likelihood detector using a decision feed forward equalizer that is coupled to the first maximum likelihood detector.

Attention is now directed to embodiments of the adjustable receiver and equalizer. FIG. 1A is an illustration of an embodiment of a communication system 100. A broadcast station 110 includes a transmitter 112. The transmitter transmits a signal via a communication channel 108. The signal may include data (such as audio and/or video information) corresponding to digital television. The bits or groups of two or more bits in the data may be modulated using an 8-VSB modulation technique, such as ATSC 8-VSB (A/53C), or another modulation technique. Such modulated data bits or groups of bits are referred to as symbols. In some embodiments, the signal may include one or more data packets, which include groups of two or more symbols. A receiver 114 receives the signal.

The receiver 114 includes a demodulator 126, a first equalizer 116-1 and a second equalizer 116-2. After demodulation in the demodulator 126, the first equalizer 116-1 determines and/or detects, and provides data estimates corresponding to the data that is communicated in the signal to the second equalizer 116-2. The second equalizer 116-2 determines and/or detects the data using the signal from the demodulator 126 and the data estimates provided by the first equalizer 116-1. The second equalizer 116-2 outputs digital output 118. The digital output 118 includes final data estimates corresponding to the data in the signal.

The first equalizer 116-1 and/or the second equalizer 116-2 may be configured, adjusted and/or adapted based on control signals 122 provided by control logic 120. The configuring, adjusting and/or adapting may be performed intermittently, continuously, and/or routinely (for example, after a pre-determined time interval since a previous update of register settings in the first equalizer 116-1 and/or the second equalizer 116-2). The control signals may be based on channel impulse response logic 124 and/or an output from the second equalizer 116-2, such as the digital output 118.

The channel impulse response logic 124 may determine one or more channel characteristics of the communication channel 108. The one or more channel characteristics may be determined using a training sequence (such as a synchronization sequence that is included with the data in the signal, for example, in a header included in one or more data packets) and/or using a pattern or sequence of symbols in the data (so-called blind determination). In some embodiments, the one or more channel characteristics may be determined during normal operation of the receiver 114. The one or more channel characteristics may include a step response, an impulse response and/or a transfer function of the communication channel 108. The one or more channel characteristics may include information corresponding to one or more multi-path signals that are received by the receiver 114. For example, the channel impulse response logic 124 may determine a pre-echo delay from the impulse response of the communication channel 108 by identifying a longest pre-echo delay (i.e., the time difference or offset between a pre-multi-path signal and a main signal) whose amplitude exceeds a predefined threshold. The one or more multi-path signals may include a pre-multi-path signal, a post-multi-path signal, or both. The one or more multi-path signals may correspond to the communication channel 108. For example, the one or more multi-path signals may be associated with reflections off of objects in the communication channel 108. In the absence of corrective action, the one or more multi-path signals may degrade the reception of the signal, and thus the determination of the digital output 118, by the receiver 114. The one or more multi-path signals are discussed further below with reference to FIG. 3.

In an exemplary embodiment, the control logic 120 may determine information corresponding to the pre-multi-path signal or the post-multi-path signal or both. The control signals 122 for the first equalizer 116-1 and/or the second equalizer 116-2 may be determined, at least in part, in accordance with this information. The control logic 120 may update the control signals 122 based on the digital output 118 from the second equalizer 116-2. As shown in FIG. 1B, in some embodiments of a communications system 150, the control logic 120 may update the control signals 122 based on an output from the first equalizer 116-1 and/or the second equalizer 116-2. For example, the control logic 120 may determine the control signals 122 and/or may update the control signals 122 (such as settings for one or more registers in the first equalizer 116-1 and/or the second equalizer 116-2) based on the output from the first equalizer 116-1 and/or the second equalizer 116-2. The output from the first equalizer 116-1 may include the data estimates and/or an error rate associated with the data estimates (such as a mean square error and/or a bit-error rate). The output from the second equalizer 116-2 may include the digital output 118 and/or an error rate associated with the digital output 118 (such as a mean square error and/or a bit-error rate). Updates of the control signals 122 may occur until a desired error rate or a threshold error rate in the digital output 118 is achieved. Settings for one or more registers in the first equalizer 116-1 and/or the second equalizer 116-2 may be determined using a least squares algorithm, a recursive least squares algorithm, and/or a least mean squares algorithm. Embodiments of the first equalizer 116-1 and the second equalizer 116-2 are discussed further below with reference to FIG. 2.

While the communication system 100 (FIG. 1A) and the communication system 150 have been shown with a particular configuration of components, it should be understood that there may be more or fewer components. Functions of two or more components may be combined into a single component. And a relative position of two or more components may be changed. Functions in the receiver 114 may be implemented in hardware (such as one or more application specific integrated circuits) and/or software (such as firmware) executed by a microprocessor or microcontroller.

Figure 2:
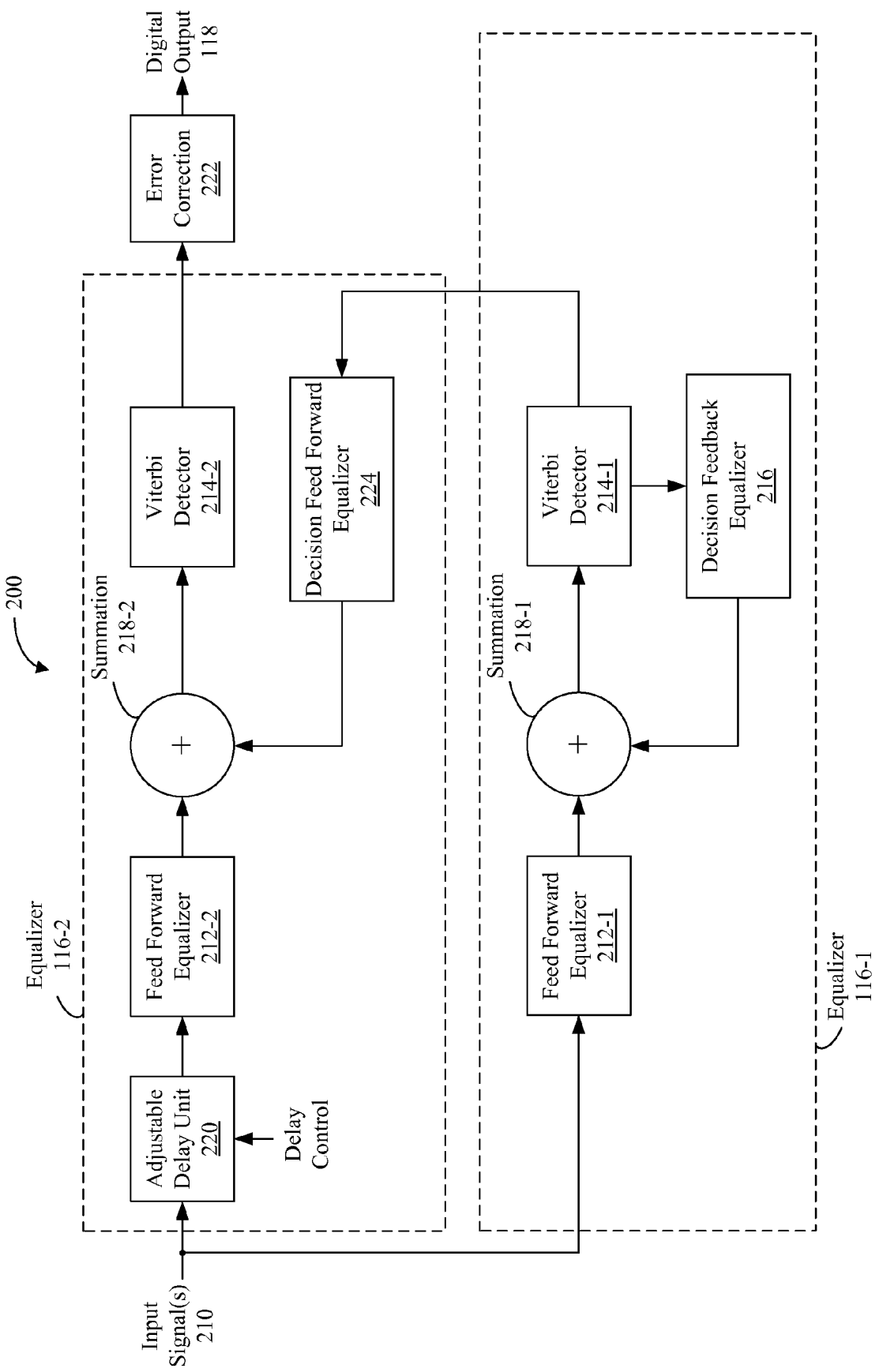
FIG. 2 is an illustration of an embodiment of a double equalizer in a receiver.

FIG. 2 is an illustration of an embodiment of a double equalizer in a receiver 200. The receiver 200, which may correspond to the receiver 114 (FIGS. 1A and 1B), includes the first equalizer 116-1 and the second equalizer 116-2. Input signals(s) 210 are coupled to a feed forward equalizer 212-1 in the first equalizer 116-1. The feed forward equalizer 212-1 may filter and/or modify a spectral content of the input signal (s) 210, e.g., using digital filtering techniques known in the art. Settings of coefficients for the feed forward equalizer 212-1 may be specified by the control signals 122 (FIGS. 1A and 1B). The feed forward equalizer 212-1, as well as feed forward equalizer 212-2, decision feedback equalizer 216 and decision feed forward equalizer 224, may include one or more analog and/or one or more digital filters. Embodiments of a digital filter are discussed further below with reference to FIG. 4.

An output from the feed forward equalizer 212-1 is coupled to summation circuit 218-1. The summation circuit 218-1 may sums the output from the feed forward equalizer 212-1 and an output from decision feedback equalizer (DFE) 216 and may couple the result to an input of Viterbi detector 214-1. The Viterbi detector 214-1 is a maximum-likelihood detector and may implement sequence detection having a corresponding path memory by performing a series of add, compare and select operations on a digital data stream. The Viterbi detector 214-1 may use a minimum Euclidean distance when performing the sequence detection.

The Viterbi detector 214-1 may include at least a first path memory and a second path memory. A respective path memory may correspond to a respective trellis in the Viterbi detector 214-1 that performs sequence detection using a respective number of symbols. In some embodiments, the first path memory has a delay that is less than the delay of the second path memory. In general, Viterbi detectors with shorter delays have lower confidence decisions than Viterbi detectors with longer delays. The memory path of a Viterbi detector can use both past and future symbols to decode the symbol "n". The Viterbi detector's output delay is proportional to the number of future symbols used for decoding symbol "n". On the other hand, Viterbi detectors that use more future symbols in decoding the "n" symbol produce higher confidence decisions than Viterbi detectors using fewer future symbols in performing the decoding of symbol "n". More specifically, the decision confidence (sometimes called the "symbol decision confidence" or "confidence metric") of a Viterbi detector is proportional to the number of symbols (e.g., past and future symbols) in the memory path length used to decode the "n" symbol. As discussed further below, a loop including the first path memory in the equalizer 116-1 and a loop including the second path memory in the equalizer 116-1 may be used, in conjunction with the equalizer 116-2, to reduce or eliminate so-called pre-multi-path and/or post-multi-path signals. Multi-path signals are discussed further below with reference to FIG. 3.

An output from the first path memory may be coupled to the decision feedback equalizer 216 thus forming a first feedback loop. The decision feedback equalizer 216 may filter and/or modify a spectral content of an output from the first path memory in the Viterbi detector 214-1, e.g., using digital filtering techniques known in the art. For example, the decision feedback equalizer 216 may reduce or eliminate intersymbol interference by reducing or eliminating so-called long-duration tails in a channel response. The decision feedback equalizer 216 may implement a forcing function or target that is specified by filter coefficients or settings in the control signals 122 (FIGS. 1A and 1B). In some embodiments, the shorter delay in the first path memory allows the decision feedback equalizer 216 to correct post-multi-path signals. As noted above, the shorter delay in the first path memory may result in lower confidence decisions. The long delay-high confidence output could be used as input to the decision feedback equalizer 216 to correct for post-multi-path signals. However, the long delay might reduce the overall equalizer performance, since the decision feedback equalizer 216 might not be able to cancel post-multi-path signals in the delay range. Instead, improved performance may be obtained by using one or more additional Viterbi detectors and an adjustable delay unit 220. In this way, high confidence output can be obtained without the penalty of a long delay, as discussed further below.

An output from the Viterbi detector 214-1 that corresponds to the second path memory may be coupled to decision feed forward equalizer 224 in the second equalizer 116-2 thereby forming a feed forward loop. This output may include the data estimates. The decision feed forward equalizer 224 may filter and/or modify a spectral content of the output from the second path memory in the Viterbi detector 214-1, e.g., using digital filtering techniques known in the art. The decision feed forward equalizer 224 may implement a forcing function or target that is specified by filter coefficients or settings in the control signals 122 (FIGS. 1A and 1B). An output from the decision feed forward equalizer 224 may be coupled to summation circuit 218-2.

In some embodiments, the input signal(s) 210 are coupled to the adjustable delay unit 220 in the second equalizer 116-2. Signal delay through the adjustable delay unit 220 (such as one or more register settings) may be specified using the control signals 122 (FIGS. 1A and 1B). The delay may be selected in accordance with a length of the second path memory, i.e., the delay may be a time that corresponds to a number of symbols that are used to perform sequence detection in a trellis that has the second path memory. In particular, the delay (of delay unit 220) may be set to allow the decision feed forward equalizer 224 to correct for both pre-multi-path and post-multi-path signals. For example, the delay of variable delay unit 220 may be set by the control logic 120 to an amount corresponding to the delay associated with the output signal produced by the first equalizer 116-1 (i.e., a delay associated with the second path memory of Viterbi detector 214-1) plus a pre-echo delay determined by the channel impulse response logic 124. In this way, the second receiver 116-2 may synchronize data in the input signal(s) 210 with the data estimates provided by the first equalizer 116-1, allowing the digital output 118 to be determined. Stated in another way, the delay of adjustable delay unit 220 is set so as to compensate for the delay associated with output signal produced by the first equalizer 116-1. As noted above, the delay of the adjustable delay unit 220 may also be selected in accordance with one or more multi-path signals in the input signal(s) 210, thereby allowing the cascaded equalizers 116 to reduce and/or eliminate interference degradation in reception associated with such interference signals. In particular, the delay may be sufficient to allow synchronization when the first equalizer 116-1 provides the data estimates in the presence of pre-multi-path signal(s) and/or post-multi-path signal(s). Thus, the first equalizer 116-1 and the second equalizer 116-2 may be used to reduce and/or eliminate the impact of pre-multi-path signal(s) and/or post-multi-path signal(s).

An output from the adjustable delay unit 220 may be coupled to the feed forward equalizer 212-2. The feed forward equalizer 212-2 may filter and/or modify a spectral content of a delayed-version of the input signal(s) 210, e.g., using digital filtering techniques known in the art. Settings of coefficients for the feed forward equalizer 212-2 may be specified by the control signals 122 (FIGS. 1A and 1B).

An output from the feed forward equalizer 212-2 may be coupled to summation circuit 218-2. In some embodiments, the summation circuit 218-2 sums the output from the feed forward equalizer 212-2 and the output from the decision feed forward equalizer 224, and produces a result that is coupled to Viterbi detector 214-2. The Viterbi detector 214-2 is a maximum-likelihood detector and may implement sequence detection having a corresponding path memory by performing a series of add, compare and select operations on a digital data stream. The Viterbi detector 214-2 may use a minimum Euclidean distance when performing the sequence detection.

The Viterbi detector 214-2 may include a third path memory, which corresponds to a trellis in the Viterbi detector 214-2 that performs sequence detection using a corresponding number of symbols. In some embodiments, the third path memory of the Viterbi detector 214-2 has a delay that is longer than the delay of the first path memory of the Viterbi detector 214-1. The Viterbi detector 214-2 may determine and/or detect the data in the input signal(s) 210 using a delayed version of the input signal(s) 210 and the data estimates provided by the Viterbi detector 214-1.

In some embodiments, an output from the Viterbi detector 214-2 is coupled to an error correction circuit or module 222. The error correction circuit or module 222 corrects missing or incorrect data and outputs the digital output 118. The error correction circuit or module 222 may implement one or more error identification codes and/or one or more error correction codes, such as a BCH code. For example, the error correction circuit or module 222 may implement a Reed-Solomon code. The error correction circuit or module 222 may also implement an interleaver and a randomizer.

In an exemplary embodiment, the adjustable delay unit 220 is a variable depth first-in first-out (FIFO) memory. The adjustable delay unit 220 may be able to accommodate delays up to 70 μs. The decision feedback equalizer 216 and decision feed forward equalizer 224 may be time-domain finite impulse response filters having 576 taps. The feed forward equalizers 212 may be time-domain finite impulse response filters having 768 taps. Settings of coefficients in the decision feedback equalizer 216, the decision feed forward equalizer 224 and/or the feed forward equalizers 212 may be adjusted using systematic under relaxation. Updates of the coefficients may be performed for each symbol in the data, or after a time interval corresponding to 100, 200, 400 or 800 symbols. The first path memory in the Viterbi detector 214-1 may correspond to a delay of zero symbols and the second path memory in the Viterbi detector 214-1 may correspond to a delay of 200 symbols. The third path memory in the Viterbi detector 214-2 may correspond to a delay of 200 symbols. The first path memory may use past symbols (i.e., ones without a delay), and the second and third path memories may use past and future symbols. In another embodiment, the first feedback loop of the first Viterbi detector 214-1 has a zero delay, and thus uses only past symbols, while the second path memory of the Viterbi detector 214-1 uses both past and future symbols and has a delay that is longer than a pre-determined value. The output of the Viterbi detector 214-1 that is coupled to decision feed forward equalizer 224 has a symbol decision confidence proportional to a length of the second path memory. The output of the second Viterbi detector 214-2 is characterized by a symbol decision confidence proportional to a length of the third path memory, which also has a delay longer than the pre-determined value and uses both past and future symbols.

By iteratively determining the data in the signal using two equalizers 116 that are active at the same time, the receiver 200 may be able to reduce and/or eliminate the impact of multi-path signals, including pre-multi-path signals and/or post-multi-path signals.

While the receiver 200 has been shown with a particular configuration of components, it should be understood that there may be more or fewer components. For example, in some embodiments the receiver 200 may include one or more additional cascaded maximum-likelihood detectors. Functions of two or more components may be combined into a single component. And a relative position of two or more components may be changed. Functions in the receiver 200 may be implemented in hardware (such as one or more application specific integrated circuits) and/or software (such as firmware) executed by a microprocessor or microcontroller.

Figure 3:
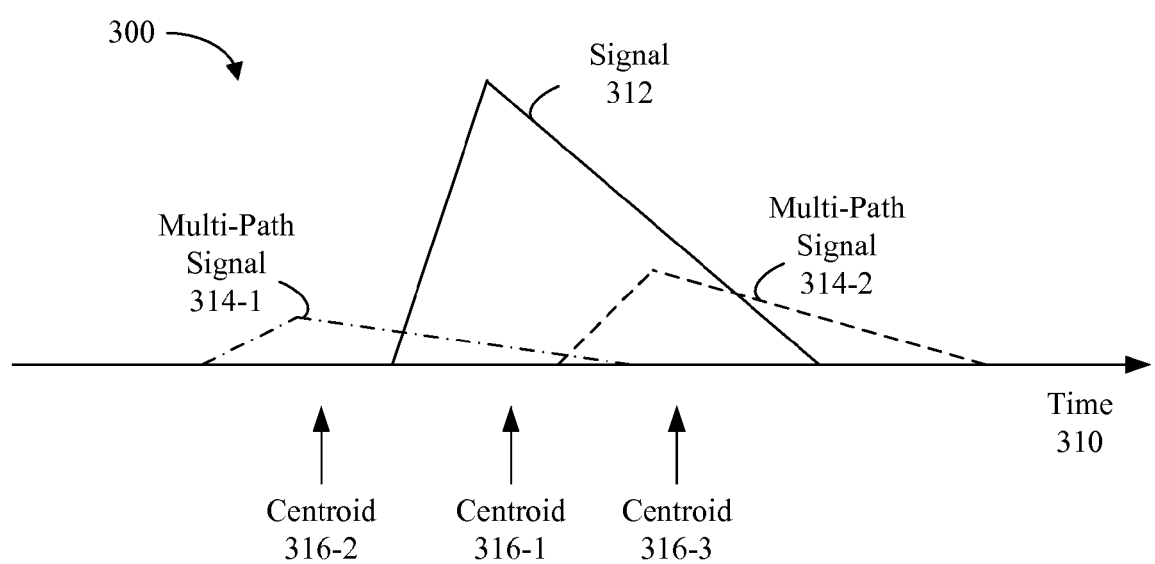
FIG. 3 is an illustration of an exemplary signal and corresponding exemplary multi-path signals.

FIG. 3 is an illustration of an embodiment 300 of a signal 312 and multi-path signals 314 as a function of time 310. For simplicity, only two multi-path signals 314 are shown in FIG. 3. In some embodiments, there may be fewer or additional multi-path signals 314. The signal 312 has an amplitude and a predefined temporal characteristic, such as a temporal centroid 316-1. The multi-path signals have corresponding amplitudes and predefined temporal characteristics, such as temporal centroids 316-2 and 316-3. Multi-path signal 314-1 has a centroid 316-2 that precedes the centroid 316-1 of the signal 312. The multi-path signal 314-1 is sometimes referred to as a pre-multi-path signal. Multi-path signal 314-2 has a centroid 316-3 that follows the centroid 316-1 of the signal 312. The multi-path signal 314-2 is sometimes referred to as a post-multi-path signal.

Figure 4:
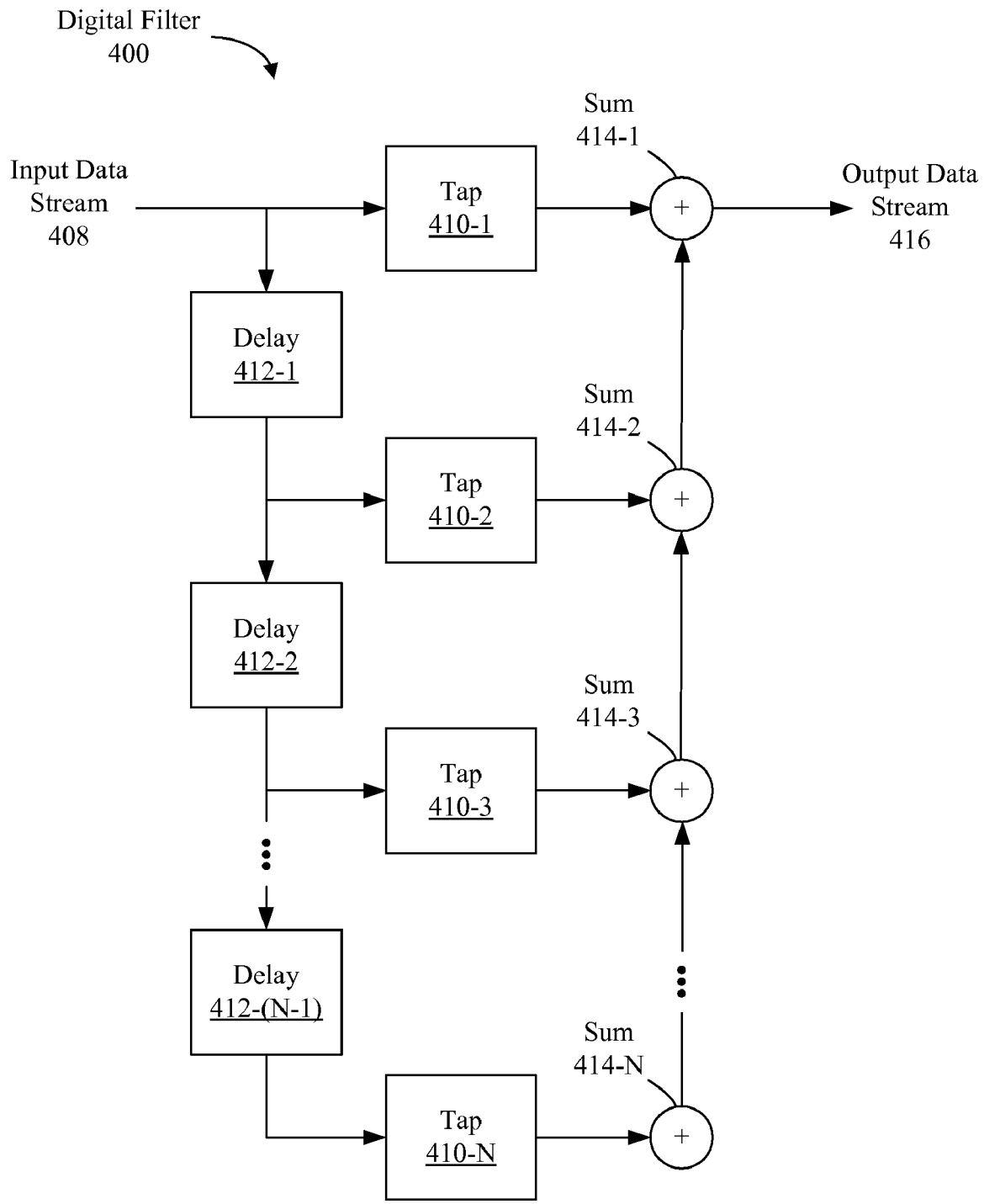
FIG. 4 is an illustration of an embodiment of a digital filter.

FIG. 4 is an illustration of one embodiment of a digital filter 400 for filtering an input data or symbol stream 408 and producing an output data or symbol stream 416. The digital filter 400 includes four taps 410, three delay circuits 412 and four summation circuits 414. The delay circuits 412, which may be implemented using clocked registers, may be clocked using signals from a clock. The clock may be derived from the input signal(s) 210 (FIG. 2) and/or the digital output 118 (FIG. 2) using a phase locked loop and/or a delay locked loop. While the digital filter 400 has been shown with four taps 410, in other embodiments there may be fewer or more taps. Additional taps will have additional delay circuits 412 and summation circuits 414. In some embodiments, the digital filter 400 may be implemented as an infinite impulse response filter as opposed to the finite impulse response filter that is illustrated in FIG. 4.

Figure 5:
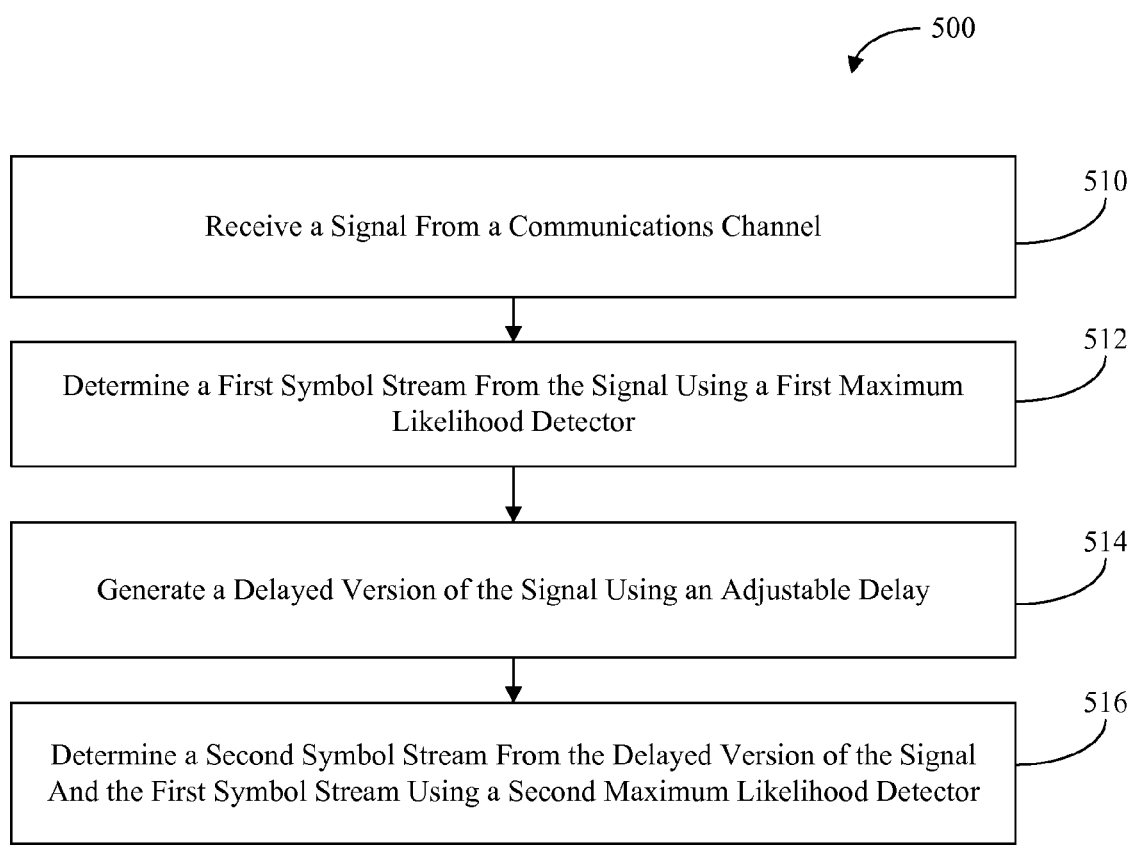
FIG. 5 is a flow diagram of one embodiment of a method of operating a double equalizer.

Attention is now directed towards embodiments of processes for using the adaptive receiver described above. FIG. 5 is a flow diagram of one embodiment 500 of a process for operating a pair of cascaded equalizers. A signal is received from a communications channel (510). A first symbol stream is determined from the signal using a first maximum likelihood detector (512). A delayed version of the signal is generated using a variable delay (514). A second symbol stream is determined from the delayed version of the signal and the first symbol stream using a second maximum likelihood detector (516). While the embodiment 500 includes a number of operations that appear to occur in a specific order, it should be apparent that these processes can include more or fewer operations, which can be executed serially or in parallel (e.g., using parallel processors or a multi-threading environment), an order of two or more operations may be changed and/or two or more operations may be combined into a single operation.

Devices and circuits described herein can be implemented using computer aided design tools available in the art, and embodied by computer readable files containing software descriptions of such circuits, at behavioral, register transfer, logic component, transistor, and layout geometry level descriptions stored on storage media or communicated by carrier waves. Data formats in which such descriptions can be implemented include, but are not limited to, formats supporting behavioral languages like C; formats supporting register transfer level RTL languages like Verilog and VHDL; and formats supporting geometry description languages like GDSII, GDSIII, GDSIV, CIF, MEBES, and other suitable formats and languages. Data transfers of such files on machine readable media including carrier waves can be done electronically over the diverse media on the Internet or through email, for example. Physical files can be implemented on machine readable media such as 4 mm magnetic tape, 8 mm magnetic tape, 3½ inch floppy media, magnetic hard disks, CDs, DVDs, and so on.

Figure 6:
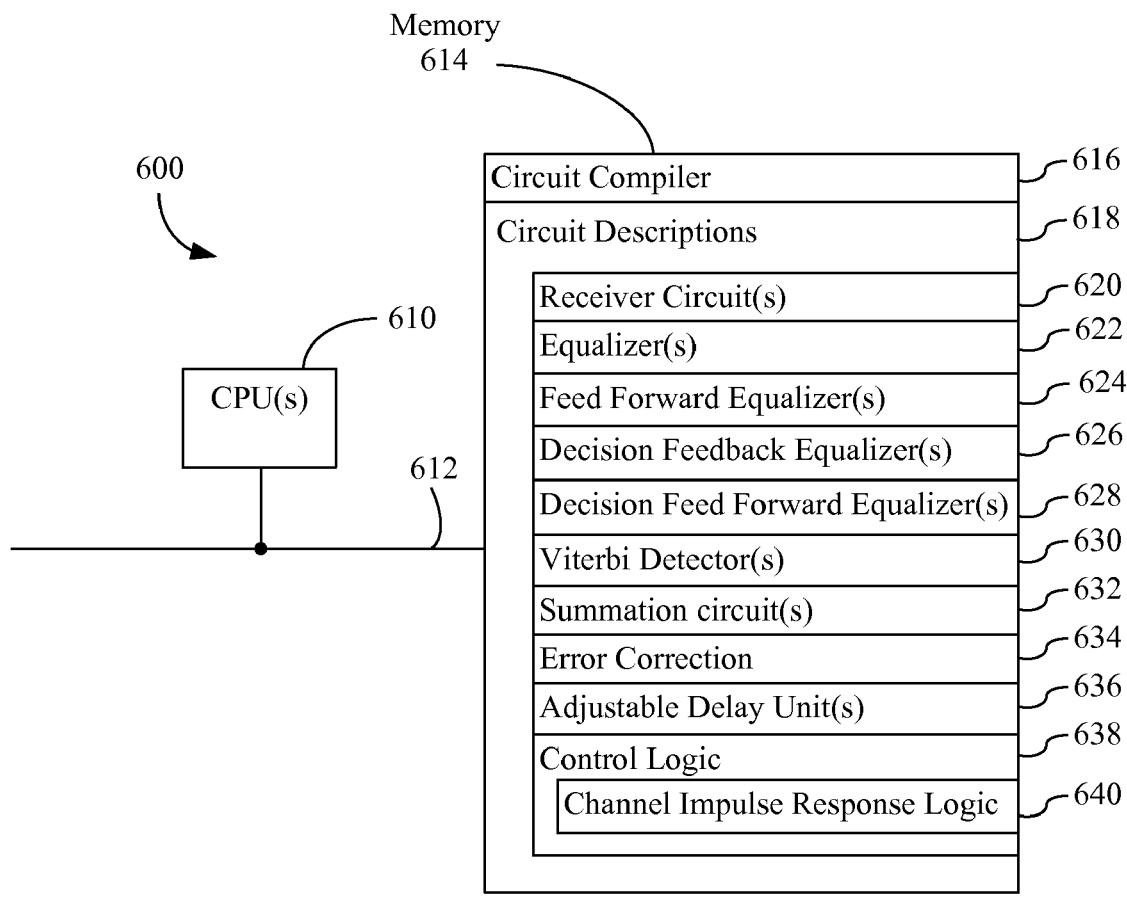
FIG. 6 is a block diagram illustrating an embodiment of a system that includes a receiver with a double equalizer.

FIG. 6 is a block diagram an embodiment of a system 600 for storing computer readable files containing software descriptions of the circuits. The system 600 may include at least one data processor or central processing unit (CPU) 610, memory 614, and one or more signal lines 612 for coupling these components to one another. The one or more signal lines 612 may constitute one or more communications buses.

Memory 614 may include high-speed random access memory and/or non-volatile memory, such as one or more magnetic disk storage devices. Memory 614 may store a circuit compiler 616 and circuit descriptions 618. The circuit descriptions 618 may include circuit descriptions for one or more receiver circuits 620, one or more equalizers 622, one or more feed forward equalizers 624, one or more decision feedback equalizers 626, one or more decision feed forward equalizers 628, one or more Viterbi detectors 630, one or more summation circuits 632, error correction 634, one or more adjustable delay units 636, and control logic 638. The control logic 638 may include channel impulse response logic 640. More generally, the circuit descriptions 618 may include circuit descriptions for one or more embodiments of the circuits described above. The circuit compiler 616 may be used to convert the circuit descriptions 618, or a subset thereof, into a circuit layout.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An apparatus for improving reception of a signal, comprising:
    an equalizer, including:
        at least two cascaded maximum-likelihood detectors; and
        an adjustable delay unit,
        wherein the equalizer and the adjustable delay unit are configured for adaptation in accordance with one or more multi-path signals in a communication channel that conveys the signal; and
        wherein the cascaded maximum-likelihood detectors include a first maximum-likelihood detector and a second maximum-likelihood detector, the first maximum-likelihood detector includes a first feedback loop based on a first path memory that has a delay that is shorter than a pre-determined value and has a first output that corresponds to a second path memory that has a delay that is longer than the pre-determined value, and wherein the second maximum-likelihood detector is coupled to the first output and has an output that corresponds to a third path memory that has a delay that is longer than the pre-determined value.

2. The apparatus of claim 1, wherein the adjustable delay unit is configured for adaptation in accordance with a length of the second path memory.

3. The apparatus of claim 1, wherein the adjustable delay unit is configured for adaptation in accordance with a length of the second path memory and in accordance with one or more multi-path signals in the communication channel.

4. The apparatus of claim 1, further comprising a feedback equalizer in the first feedback loop.

5. The apparatus of claim 4, wherein the feedback equalizer is a decision feedback equalizer.

6. The apparatus of claim 1, further comprising a feed forward equalizer coupled to the first maximum likelihood detector and configured to be coupled to the signal.

7. The apparatus of claim 1, further comprising a feed forward equalizer coupled to the first output and the second maximum likelihood detector.

8. The apparatus of claim 7, wherein the feed forward equalizer is a decision feed forward equalizer.

9. The apparatus of claim 1, wherein the adjustable delay unit is coupled to the second maximum likelihood detector and is configured to be coupled to the signal.

10. The apparatus of claim 1, further comprising a feed forward equalizer coupled to the adjustable delay unit and the second maximum likelihood detector.

11. The apparatus of claim 1, further comprising an error correction circuit coupled to the output of the second maximum-likelihood detector.

12. The apparatus of claim 1, wherein outputs from the second maximum-likelihood detector have an associated confidence metric that is greater than that of outputs from the first maximum-likelihood detector.

13. The apparatus of claim 1, wherein the second maximum likelihood detector is configured to detect data in the signal in accordance with data estimates provided by the first maximum likelihood detector.

14. The apparatus of claim 1, wherein the first feedback loop of the first maximum-likelihood detector has a zero delay, the second path memory uses both past and future symbols and has a delay that is longer than the pre-determined value, and the first output of the first maximum-likelihood detector is characterized by a symbol decision confidence proportional to a length of the second path memory; and wherein the second output of the second maximum-likelihood detector is characterized by a symbol decision confidence proportional to a length of the third path memory, which uses both past and future symbols.

15. The apparatus of claim 1, wherein the output of the second maximum-likelihood detector is characterized by a symbol decision confidence proportional to a length of the third path memory, and wherein the adjustable delay unit is configured to compensate for the delay of the second path memory of the first maximum-likelihood detector.

* * * * *

UNITED STATES PATENT AND TRADEMARK OFFICE
CERTIFICATE OF CORRECTION

PATENT NO. : 7,646,806 B2
APPLICATION NO. : 11/428810
DATED : January 12, 2010
INVENTOR(S) : Yossef Cohen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 792 days.

Signed and Sealed this

Sixteenth Day of November, 2010

David J. Kappos
*Director of the United States Patent and Trademark Office*